United States Patent [19]

Koopman

[11] Patent Number: 5,361,686
[45] Date of Patent: Nov. 8, 1994

[54] ROTISSERIE OVEN

[75] Inventor: Peter J. Koopman, Richmond, Ind.

[73] Assignee: Henny Penny Corporation, Eaton, Ohio

[21] Appl. No.: 973,037

[22] Filed: Nov. 10, 1992

[51] Int. Cl.⁵ .......................... A21B 1/06; A47J 37/04
[52] U.S. Cl. ....................... 99/421 H; 99/341; 99/446; 99/447; 99/476; 126/21 A; 219/214; 219/400
[58] Field of Search ............... 99/427, 446, 467, 419, 99/476, 421 H, 401, 421 HH, 447, 341, 421 HV, 421 R, 421 V, 421 P, 421 TP, 421 M; 126/21 A; 219/400, 214; 312/236

[56] References Cited

U.S. PATENT DOCUMENTS

| | | | |
|---|---|---|---|
| 3,861,378 | 1/1975 | Rhoads et al. | 126/21 A |
| 4,029,463 | 6/1977 | Johansson et al. | 126/21 A |
| 4,180,049 | 12/1979 | Carr et al. | 126/21 A |
| 4,233,495 | 11/1980 | Scoville et al. | 312/236 X |
| 4,462,383 | 7/1984 | Henke et al. | 99/476 X |
| 4,515,143 | 5/1985 | Jabas | 312/236 X |
| 4,626,661 | 12/1986 | Henke | 219/400 |
| 4,743,728 | 5/1988 | Nagafusa et al. | 219/400 X |
| 4,780,596 | 10/1988 | Matsushima et al. | 219/400 |
| 4,892,030 | 1/1990 | Grieve | 126/21 A |
| 4,935,604 | 6/1990 | Allen et al. | 219/400 |

FOREIGN PATENT DOCUMENTS

2105459  3/1983  United Kingdom .............. 219/400

*Primary Examiner*—Timothy F. Simone
*Attorney, Agent, or Firm*—Baker & Botts

[57] ABSTRACT

A rotisserie oven includes an air plenum having three sections surrounding a cooking chamber. Two sections extend along opposing lateral walls while a third section extends along the top wall of the cooking chamber. Exhaust vents in the air plenum provide forced, heated air into the cooking chamber from three sides. The inlet and exhaust vents have hooded louvers to reduce the amount of grease entering the air plenum. A grease collection device includes a drawer having two handles for easier manipulation thereof. A control system, disposed at the bottom of the oven near the grease drawer, is isolated from the relatively hot cooking chamber by a stream of cool ambient air. A temperature sensor is disposed on the suction chamber side of a blower and near the oven door so that changes in the cooking chamber temperature are rapidly sensed.

11 Claims, 8 Drawing Sheets

ROTISSERIE OVEN

BACKGROUND OF THE INVENTION

1. Field of the Invention

This invention is directed to improvements in a food cooking apparatus in general and more specifically to improvements in a rotisserie-type cooking apparatus having at least one rotatable element for supporting a food product.

2. Background of the Prior Art

Use of a rotatable element to support a food product for cooking is well known. Such rotatable elements are often referred to as rotisseries, spits, skewers and a host of other names. For simplicity the term rotisserie will be used with the understanding that this term is intended to cover all forms of rotatable elements which support food products or to which food products may be attached for cooking in all types of cooking environments including gas or electric ovens, barbecues, microwave ovens and a variety of other cooking environments.

With reference to FIGS. 1 and 2, there is shown a prior art rotisserie oven disclosed in U.S. Pat. No. 4,561,348 to Halters et al. The oven includes a casing 1 housing a grilling space 2. The grilling space is defined by a plurality of stainless steel walls 5 within outer casing 1. An air flow path is formed between the stainless steel walls 5 and casing 1. Within the air flow path is a motor 10 for a fan and a motor 4 for rotating a spit 3 on which the food is positioned in the grilling space 2. Fan blades 16, which are drivingly connected to motor 10, draw ambient air into the air flow path through apertures 17 and expel air out of the air flow path through apertures 18. The ambient air flowing through the air flow path cools the outer surface of the walls 5.

A fat collecting tray 7 is arranged below spit 3. An upper plate 8 is provided at the top of the cooking chamber. An inner space 2' is formed between the upper plate 8 and the top wall 5' of the cooking chamber. A fan 11 is provided within the inner space 2', and a suction opening 9 in the upper plate 8 permits air from the grilling space 2 to be drawn in the inner space 2'. Several heating elements are provided in the grilling space at 13, 19, 20. A grease collection device includes guide baffles 21 which divert the dripping fat to fat collecting tray 7 through drain hole 22. During cooking, air is drawn into inner space 2' through suction opening 9, expelled downwardly out of inner space 2' through exhaust aperture 12, and diverted by guide baffles 21 upwardly towards suction opening 9. Thus, a circular flow path as shown by the arrows 14 is established within the cooking chamber 2.

In general, the hottest portions of the oven are the portions proximate to the heating elements. In ovens without forced air, a temperature gradient is created whereby the temperature is the highest at the top of the cooking chamber. Even with forced air, though, experience has shown that temperature gradients are formed towards the top of the cooking chamber. In U.S. Pat. No. 4,561,348, the fan motor 10 is disposed above the hot grilling space 2. Consequently, an additional cooling apparatus must be provided. In particular, the '348 patent provides a cooling flow channel extending around the outside of the grilling space 2. The necessity for such an additional cooling apparatus is likely obviated, however, if the temperature sensitive components such as fan motors are relocated.

In addition, in prior art rotisserie ovens in general and in the '348 rotisserie oven in particular, a cylindrical envelope can be defined by the rotatable spit. More particularly, at one end of the rotatable spit 3, a first drum is fixedly mounted thereon and at the other end of the rotatable spit 3, a second drum is fixedly mounted thereon. A cylindrical envelope can be defined between these drums within the cooking chamber. The air within the grilling space 2 is generally directed in a circular path which is tangential to the cylindrical envelope. However, none of the heated air is directed to the inside of the cylindrical envelope. When arranged on the spits, the food has an outer portion aligned on the outside of the cylindrical envelope and an inner portion aligned on the inside of the cylindrical envelope. Since the air is directed generally tangential to the cylindrical envelope, the surface of the food product within the cylindrical envelope is often insufficiently cooked.

Moreover, the grease collection tray disclosed in U.S. Pat. No. 4,561,348 and other prior art ovens are generally shallow, wide drawers disposed beneath the cooking chamber. When emptying the drawer, the operator physically carries the drawer, usually supporting it from below. Since the drawer is shallow, the operator must carefully balance it so that the oil contained therein does not spill while in transit. Thus, grease collection drawers according to the prior art are generally too shallow for safe disposal of the grease. Moreover, since the operator generally grasps the grease collection drawer from the bottom, which is in direct contact with the hot oil, there is a possibility of operator injury.

In addition, in the Halters et al. '348 oven, the inlet opening for the fan 11 sucks air upwardly. While a wire screen might reduce the amount of dripping grease sucked into the inlet opening 9, the screen can become clogged in operation. Therefore, it is desirable to provide a method of reducing the amount of dripping grease and deposits that are directed to the inlet of fans or blowers provided in ovens.

Still further, prior art ovens provide temperature sensors that sense the temperature of the cooking chamber. However, these sensors are often located in the cooking chamber at positions which do not provide the most accurate indication of the average lowest temperature of the cooking chamber. For example, a temperature sensor disposed at the top of the cooking chamber is generally exposed to the hottest air within the cooking space. Consequently, after the oven door is opened, the time that it takes the top of the cooking chamber to drop below the target cooking temperature is generally greater than the time that it takes the bottom of the cooking chamber to drop below the target cooking temperature. Therefore, for a faster temperature recovery upon opening of the oven door, the temperature sensor should be positioned where the lowest average cooking temperature may be read.

Furthermore, prior art ovens often employ radiant heaters to provide surface browning of the food product. By superficially scorching the surface of the food product, the outer skin locks the juices in. If quartz radiant heaters are used for surface browning, an incidental effect is to provide illumination to the interior of the cooking space. Quartz heaters generally operate at extremely hot temperatures, for example 1500° F., and are usually positioned along one of the walls of the cooking chamber. When so disposed, a concentration of heat is conducted to the walls surrounding the quartz heaters. Thus, insulation must be provided along the outer walls of the cooking chamber to isolate the walls exposed to the relatively intense heat generated by the quartz heaters. However, the necessity for additional outer insulation also increases the size of the oven.

In order to overcome these and additional disadvantages of prior art rotisseries, the rotisserie oven according to the preferred embodiment has redesigned and repositioned several of the integral components of the oven.

SUMMARY OF THE INVENTION

It is an object of the present invention to provide a rotisserie oven that directs a portion of the heated air to the interior of a cylindrical envelope defined by the interior of the rotatable spit.

It is a further object of the present invention to provide a rotisserie oven having a grease collection apparatus that is easy to manipulate and reduces the chances of grease spillage.

Still further, it is an object of the present invention to provide a rotisserie oven with heat sensitive elements such as motors, blowers and automatic control systems which are isolated from the relatively hot cooking chamber.

It is another object of the present invention to provide a rotisserie oven having an air plenum surrounding the cooking chamber in which the air flowing therethrough concomitantly cools the walls adjacent a quartz heater while providing supplementary heat to the air in the air plenum.

It is a further object of the present invention to provide a rotisserie oven having a temperature sensor which indicates an average lowest cooking chamber temperature thereby allowing a quick response to changes in temperature in the cooking chamber.

It is a further object of the present invention to provide a rotisserie oven with a mechanism for reducing the amount of grease entering the forced air flow path.

Still further, it is an object of the present invention to provide a rotisserie oven with a sensor that disables the motor rotating the spits when the door to the oven is opened to facilitate the loading and unloading of food product from the cooking chamber and for improved operator safety.

These and other objects of the invention are accomplished by providing a rotisserie-type cooking device which has a cooking chamber defined by a plurality of walls, a skirt area beneath the cooking chamber in which a control panel, a blower mechanism and grease collection drawer are housed, and an air plenum surrounding the lateral and upper portion of the cooking chamber.

More particularly, the cooking chamber according to the present invention is defined by a plurality of walls including a first lateral wall, a second lateral wall opposing the first lateral wall, a top wall, a bottom wall opposing the top wall, a front wall and a rear wall opposing the front wall. The first and second lateral walls preferably have substantially identical cross sections consisting of a web portion with angled flanges extending from either side thereof. The angled flanges provide structural integrity so that the top of the oven is sturdily supported. Moreover, a void is created between the distal ends of opposing angled flanges. A portion of the air plenum is situated within the void. In addition, the angled flanges of the first lateral side wall include respective inlet vents therein while the web portions on both the first and second lateral side walls include exhaust vents therein.

The upper wall of the cooking chamber comprises a recessed trough and a lower stepped portion. The top of the recessed trough is defined by a perforated sheet having a plurality of oblong vent holes along the length thereof. Within the recessed trough are a plurality of radiant sheathed coil heaters which convectively and radiantly heat the food product within the cooking chamber. The lower stepped portions of the upper wall have recessed housings in which illumination sources, quartz heaters which also provide radiant heat, are housed.

The front and rear walls of the cooking chamber include glass panels. A central glass panel on either one or both of the front wall or rear wall is hinged for access to the interior of the cooking chamber. On either side of the central panels are beveled side panels extending to meet with the distal ends of the angled flanges. Any suitably heat treated glass can be used for the front and rear walls. Additionally, the glass can include a reflective coating on the inside thereof. Since the front and rear walls are beveled, the range of visibility to the interior of the cooking chamber has been increased.

The bottom wall of the cooking chamber is defined by a drip tray and drain trough. The drip tray, which is sloped downwardly towards the center of the cooking chamber, directs the fat dripping off the food product towards a central drain trough. A hole in the drain trough deposits the grease in a grease drawer disposed below the bottom wall.

An air plenum is arranged outside of the cooking chamber, and includes three sections, all of which are in fluid communication with each other. The first section is arranged along the web portion of the first lateral wall in the void created between the distal ends of the angled flanges. The exhaust vent on the web portion has at least one and preferably two electric coil heaters disposed upstream thereof and another disposed downstream thereof. Thus, the air exiting the first exhaust vent has been heated by at least the first bank of heaters.

The second section of the air plenum, which is in fluid communication with the first section, runs along the top and outside of the cooking chamber. A portion of the second section extends over the recessed housings which house the quartz heaters in the top wall. Thus, the air flowing in the second section provides a cooling buffer between the outer top wall of the oven and the relatively hot quartz heaters. Some of the air flowing through the second section exits through the plurality of oblong holes in the perforated sheet whereupon it enters the cooking chamber.

The third section of the air plenum, which is in fluid communication with the second section, runs along the web portion of the second lateral wall in the void between the distal ends of the angled flanges. The air flowing within the third section exits through the exhaust vent on the second lateral wall. The mass flow rate and the temperature of the air exiting the exhaust vent on the first lateral wall is preferably substantially the same as that exiting the exhaust vent on the second lateral wall.

Between the first and second lateral walls extends a drive shaft. At one end of the drive shaft is a disc fixedly connected thereto, and at the other end of the drive shaft is another disc fixedly connected thereto. A cylindrical envelope can be defined between the discs. The air exhausted from the first exhaust vent is directed into one end of the cylindrical envelope and the air exhausted from the second exhaust vent is directed into the other end of the cylindrical envelope. Accordingly, the portion of the food product facing the interior of the cylindrical envelope will be sufficiently cooked. Moreover, by directing a stream of forced heated air into the center of the cylindrical envelope, the cooking efficiency has been increased since a more even heat distribution is developed across the food product.

A skirt area of the oven includes the portion below the cooking chamber. Within the skirt area are housed a grease drawer, a control system and a blower mechanism. The grease drawer includes an outer wall preferably flush with the outer skirt. A handle depends from the outer wall. The height of the lateral walls of the grease drawer are preferably at least half the width of the drawer. Accordingly, wave formation and propagation will be reduced by the relatively close side walls. Additionally, a second handle structure extends within the drawer between the lateral walls thereof. This facilitates grease disposal, as the operator, when transporting the drawer, firmly grasps a respective handle with each hand. Additionally, since the operator does not grasp the drawer from the bottom, the likelihood of the operator burning themselves is reduced.

A control system is disposed adjacent the grease drawer in the skirt area. The control system controls the mechanical components, i.e., heaters, motors, and blower, in response to external indicia such as the sensed temperature and the opening of the oven door.

A blower mechanism, which is also disposed in the skirt area, generates a forced air flow stream within the air plenum. Air from the cooking chamber is sucked in inlet vents, directed through blower, and exhausted into the first section of the air plenum. Since the blower is positioned within the skirt area, it is isolated from the hot cooking chamber. Moreover, since disposed at the bottom of the cooking chamber where typically the relatively coolest air congregates, the blower provides a more even distribution of heat within the cooking chamber. In addition, a temperature sensor is positioned near the inlet vents. Accordingly, the air crossing the temperature sensor is more indicative of the average lowest temperature in the cooking chamber than a temperature sensor located at the top of the cooking chamber.

A service fan is operatively connected to the rear side of the blower. The service fan draws ambient air into the skirt area from outside of the oven. The flow of ambient air is arranged such that the air sucked in by the service fan is directed over the control system. Accordingly, a cooling buffer ensures that the control system does not overheat.

These and other features and objects of the present invention will become apparent when the specification is read in conjunction with the accompanying drawings.

DETAILED DESCRIPTION OF THE PREFERRED EMBODIMENT

Figure 1:
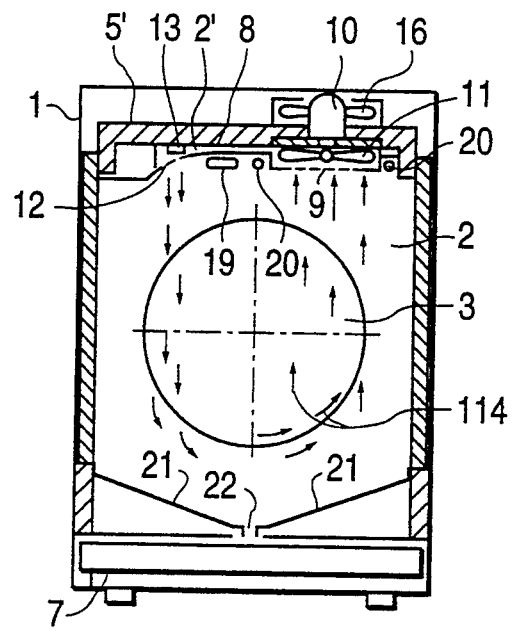
FIG. 1 is a side cross sectional view of a rotisserie oven according to the prior art.
Figure 2:
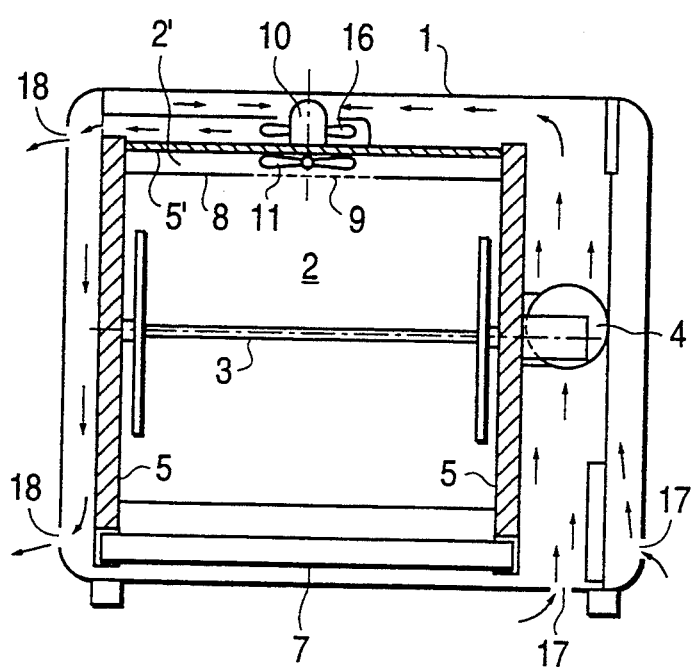
FIG. 2 is a front cross sectional view of the rotisserie oven of FIG. 1.
Figure 3:
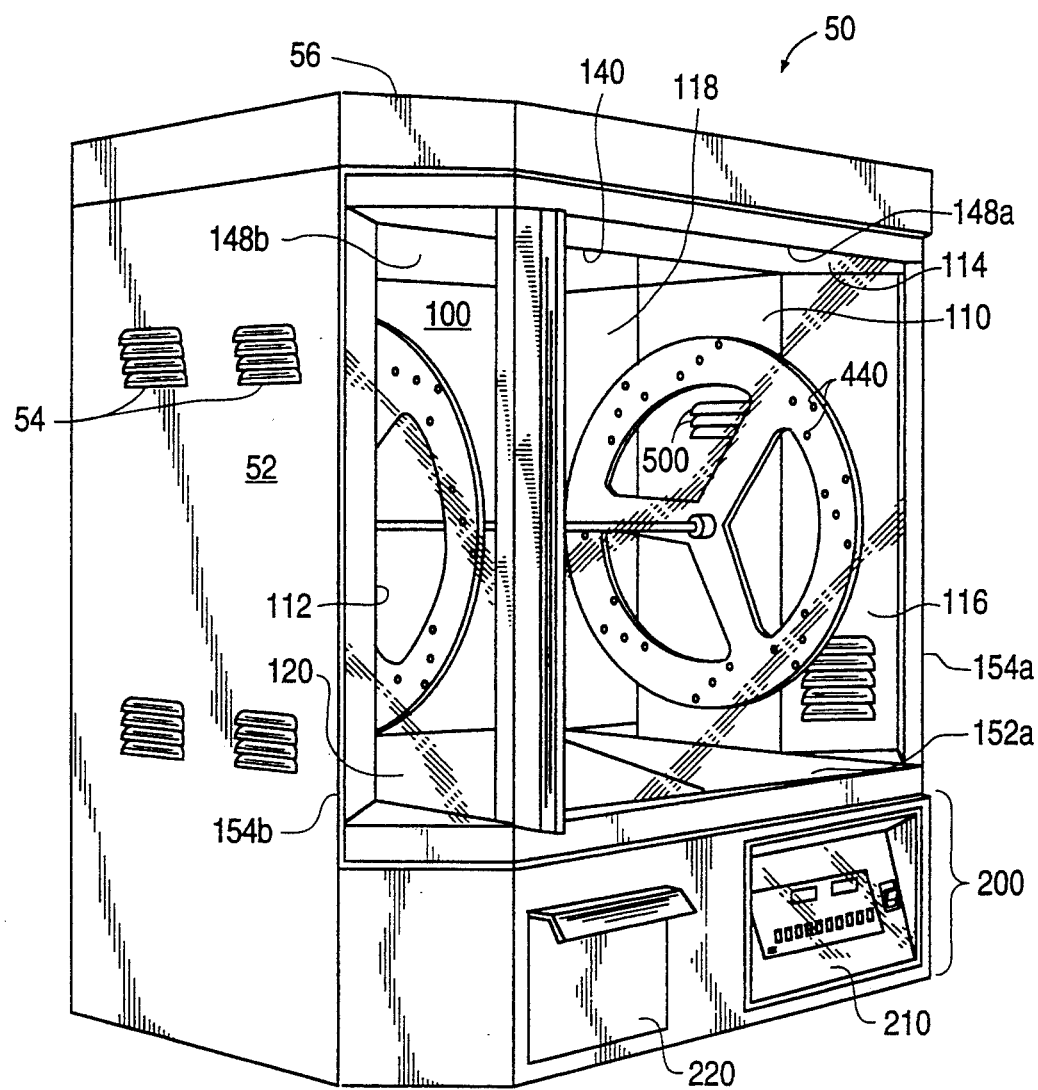
FIG. 3 is a perspective view of the rotisserie oven according to the preferred embodiment.

With reference to FIG. 3, there is shown a rotisserie oven, generally indicated as 50, according to the preferred embodiment. The oven includes a cooking chamber 100 defined by a plurality of walls, a skirt area 200 beneath the cooking chamber 100 in which a control panel 210 and a grease collection drawer 220, among other things, are housed, and an air plenum (not shown in FIG. 3) surrounding the lateral and upper portions of the cooking chamber 100. Outer side panels 52 define the exterior side walls of oven 50. Louvers 54 on outer side panels 52 allow ingress and egress of air to the interior side of panels 52.

Figure 4:
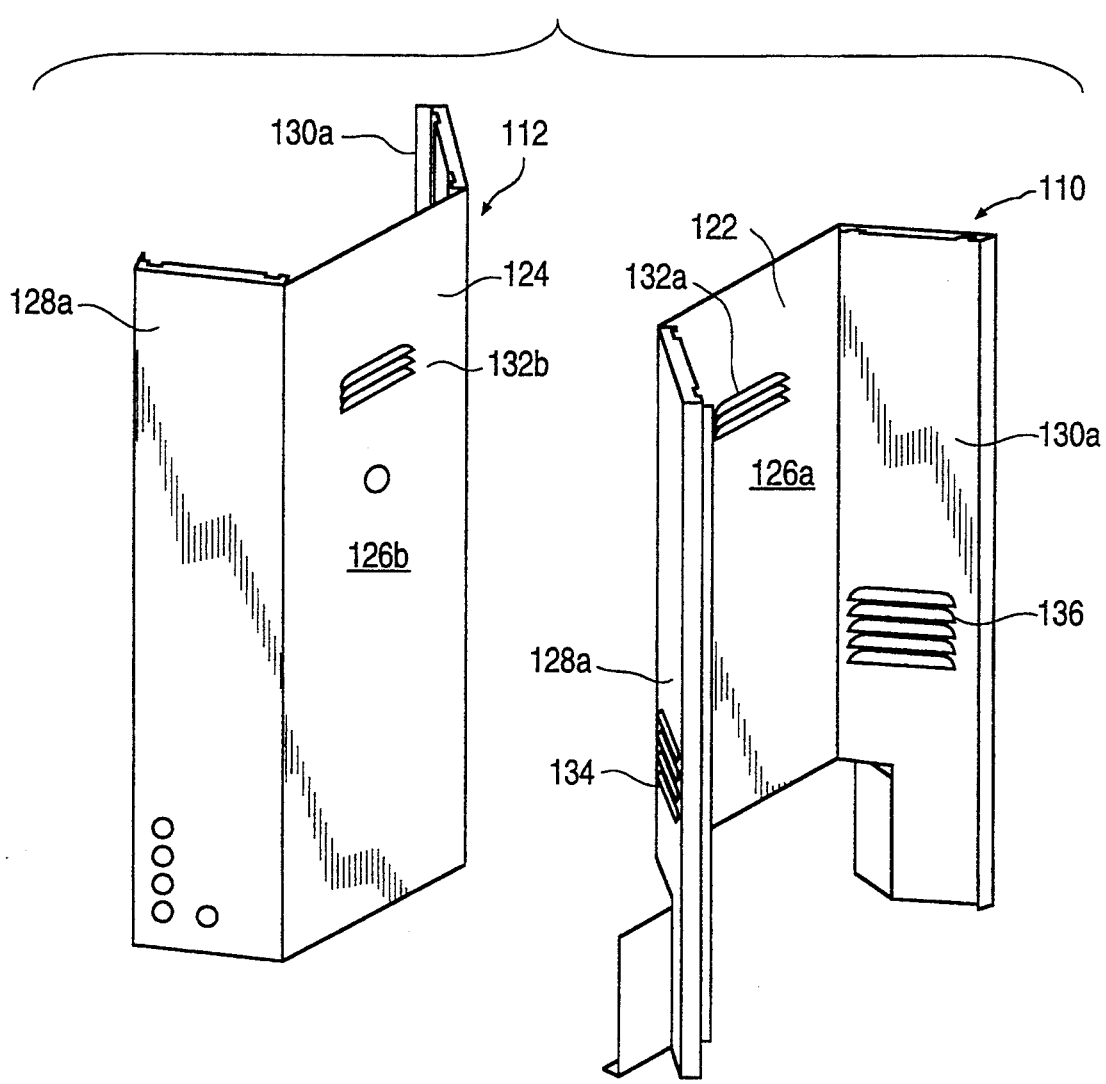
FIG. 4 is a perspective view of the lateral side walls of the rotisserie oven according to the preferred embodiment.

The cooking chamber 100 is defined by a first lateral wall 110, a second lateral wall 112, an upper wall 114, a front wall 116, a rear wall 118, and a lower wall 120. With reference to FIG. 4, the first and second lateral walls 110, 112 of the cooking chamber are preferably formed from vertical channels 122, 124, each having similar cross sections. The first vertical channel 122 includes a web portion 126a having angled flanges 128a, 130a extending from either side thereof. An exhaust vent 132a is formed in the web portion 126a of first lateral wall 110 while two inlet vents 134, 136 are formed in respective angled flanges 128b, 130b of the first lateral wall 110. The second lateral wall 112, similar to the first lateral wall 110, includes a web portion 126b with angled flanges 128a, 130a extending therefrom. An exhaust vent 132b is also formed in the web portion 126b of the second lateral wall 112. The interior side of vertical channels 122, 124 define part of the lateral sides of the cooking area.

Figure 5:
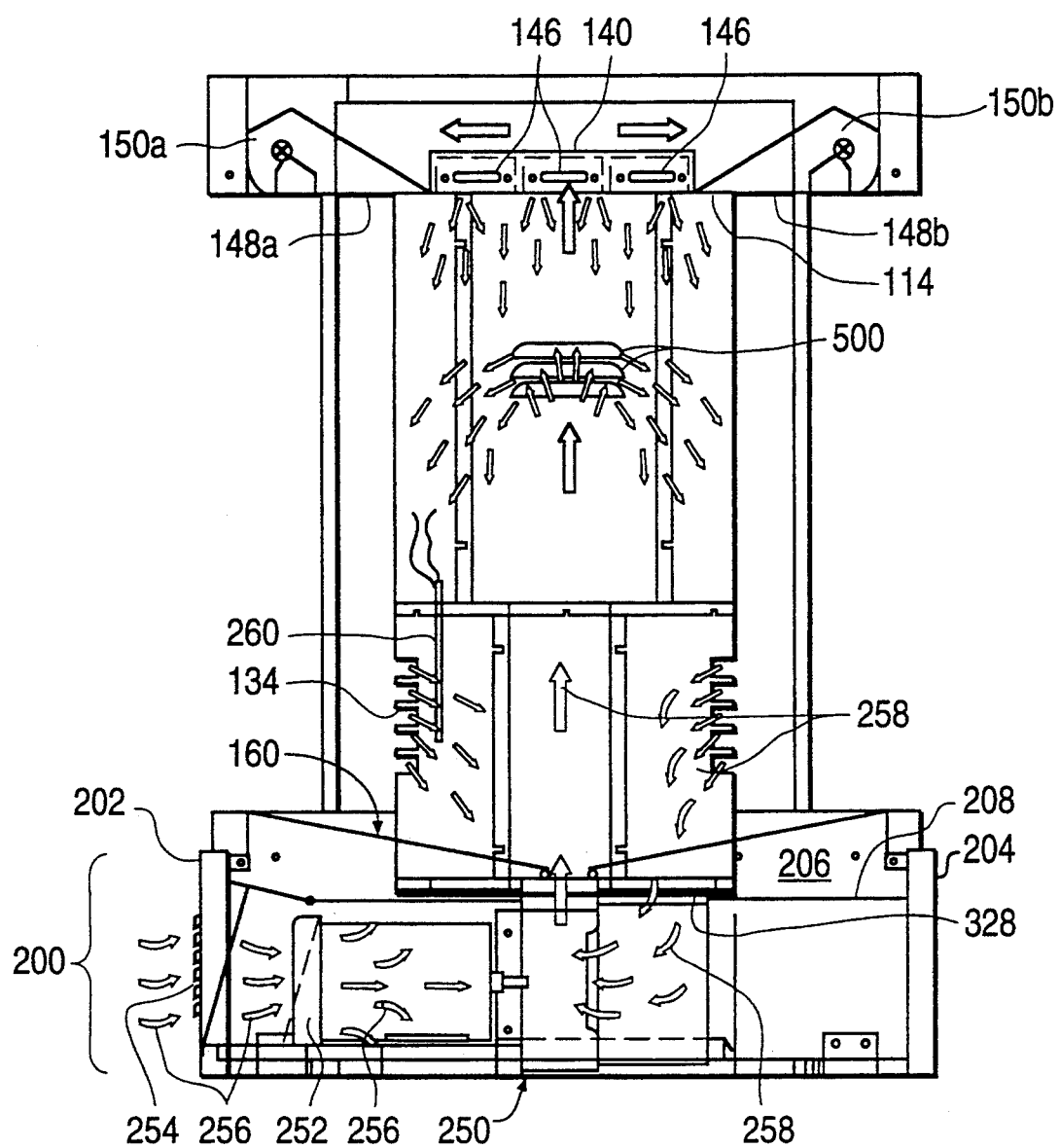
FIG. 5 is a cross section of the rotisserie oven according to the preferred embodiment taken along section 5—5 of FIG. 8.
Figure 6:
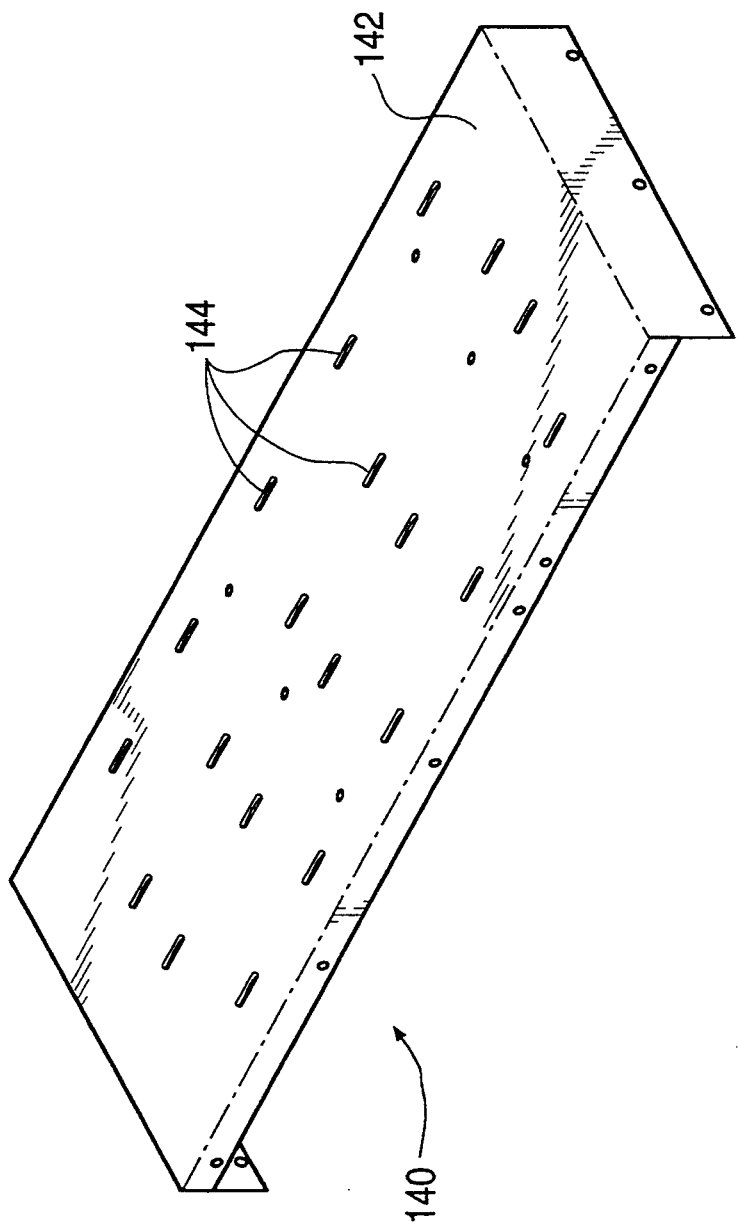
FIG. 6 is a perspective view of the trough portion of the upper wall of the cooking chamber according to the preferred embodiment.
Figure 7:
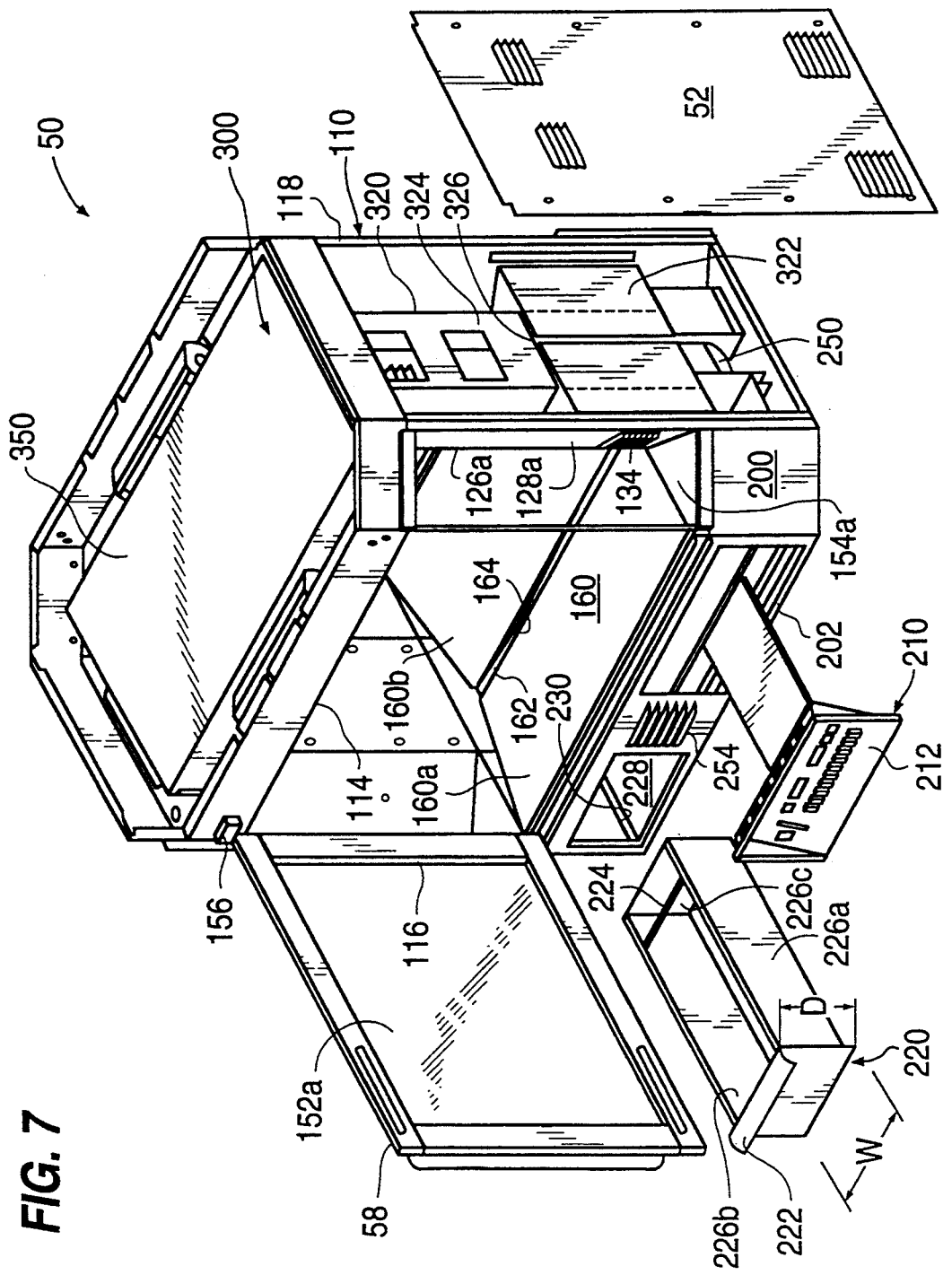
FIG. 7 is a blown-away perspective of the rotisserie oven according to the preferred embodiment.

With reference to FIGS. 3 and 5, the upper wall 114 of the cooking chamber is partially defined by a recessed, rectangular trough 140 extending from the first lateral wall 110 to the second lateral wall 112 and having a width preferably corresponding to the width of the web portions 126a, 126b of the vertical channels 122, 124. As best seen in FIG. 6, the top of the recessed trough 140 comprises a perforated sheet 142 having a plurality of oblong vent holes 144 along the length thereof. A plurality of electric coil radiant heaters 146 (FIG. 5) depend from the web portion 126b of the second lateral wall 112 within the recessed trough 140. Additionally, the upper wall 114 of the cooking chamber is defined by front and rear lower, stepped portions 148a, 148b on either side of the recessed trough 140. The front and rear lower stepped portions 148a, 148b extend to the angled flanges 128, 130 on both lateral side walls 110, 112 and define the outer peripheral area of the upper wall 114. Within both the front and rear lower stepped portions 148a, 148b are recessed housings 150a, 150b (FIGS. 5 and 7). A lighting source, which might also function as a radiant heater, e.g., quartz lamp, is disposed in each of the recessed housings 150a, 150b. Alternatively, only one recessed housing could be provided in the top wall 114.

In addition to defining a portion of the lateral side walls 110, 112 of the cooking chamber, the vertical channels 122, 124 support the upper wall 114 of the cooking chamber. The structural strength of the oven is substantially increased by the angled flanges 128, 130. A void is created between the distal ends of angled flanges, and within the void, a portion of the air plenum system 300 is disposed.

With reference to FIGS. 3 and 7, the front and rear walls 116, 118 of the cooking chamber comprise glass panels 152a, 152b which allow visual inspection of the food therein. Additionally, each of the front and rear walls 116, 118 includes beveled side glass panels 154a, 154b. At one of their ends, the beveled panels 154 adjoin center panel 152 and at their other end, the beveled panels 154 adjoin angled flanges 128, 130. The center panel 152a is hinged at 156, thereby providing an access door to the cooking chamber. Alternatively, both center panels 152a, 152b can be hinged to provide access to the cooking chamber from either side of the oven. The beveled configuration, in addition to being aesthetically pleasing, provides substantially more visibility to the interior of the cooking chamber than an oven with a flat glass wall. Accordingly, customers can see the food even if they are not aligned directly in front of the oven. Any suitable heat tempered glass, e.g., soda lime or boro silicate glass, can be used for the front and rear walls 116, 118. Alternatively, for improved cooking performance and efficiency, the glass can be treated with a coating, e.g., tin oxide, which reflects some of the heat back into the cooking chamber.

Still referring to FIG. 7, the lower wall 120 of the cooking chamber is defined by a drip tray 160 and drain trough 162. The drip tray consists essentially of two pieces of sheet metal 160a, 160b. The first sheet metal piece 160a depends from the bottom of the front wall 116 and converges downwardly towards the bottom center of the cooking chamber. The second sheet metal piece 160b depends from the bottom of the rear wall 118 and converges downwardly towards the bottom center of the cooking chamber. Both halves of the drip tray 160 terminate in drain trough 162. Drain trough 162 consists of a long slender channel of sheet metal extending from the first lateral wall 110 to the second lateral wall 112. A drain hole 164 is provided in drain trough 162, and on either side of the drain hole 164, the drain trough 162 slopes upwardly. Accordingly, all grease accumulating in drain trough 162 is directed towards drain hole 164. In operation, grease dripping from the food flows down drip tray 160 to the drain trough 162. Once in the sloped drain trough 162, the grease flows downwardly towards the drain hole 164, and is ultimately deposited in grease drawer 220.

As seen in FIG. 7, air plenum 300 preferably extends along the outside of the cooking chamber, and for simplicity, can be described with reference to three sections, all of which are in fluid communication with each other. First section 320 of air plenum is disposed on the side of the web portion 126a which is opposite the cooking chamber. Second section 350 of the air plenum extends over the upper wall 114, and the third section 380 (FIG. 8) of the air plenum is disposed on the side of the web portion 126b which is opposite the cooking chamber 100.

More particularly, the first section 320 of the air plenum includes a first housing 322 having a duct 324 extending therethrough. The interior surface of the first housing 322, the exterior surface of the duct 324, and exterior surface of the first lateral wall 110 define a suction chamber. A gap 326 is formed between the interior surface of first housing 322 and the exterior surface of duct 324. The cooking chamber communicates with suction chamber through the inlet vents 134, 136 on the angled flanges 128a, 130a of the first lateral wall 110. Since the suction chamber is on the low pressure side of a blower 250, the first housing 322 operates as an inlet chamber to air sucked through the inlet vents 134, 136. Air received in the rear inlet vent 136 flows through the gap 326 between the outer wall of duct 324 and inner wall of first housing 322. An inlet hole 328 (FIG. 5) in the first housing 322 directs the air from inlet vents into the low pressure, suction side of blower 250. After passing though blower 250, the air is expelled into duct 324 which forms the air passageway for the first section 320.

Figure 8:
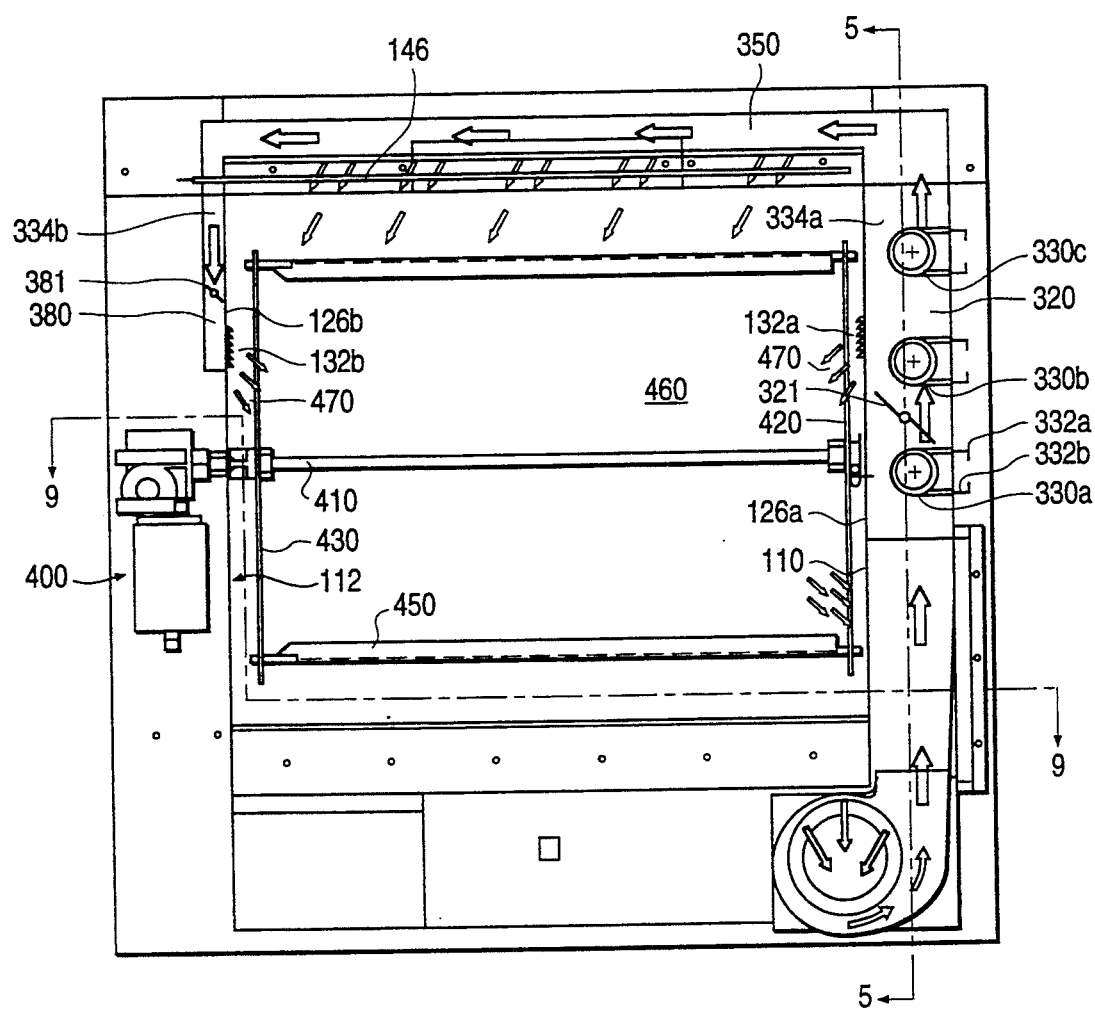
FIG. 8 is a diagrammatic front elevational view of the oven according to the preferred embodiment.

As seen in FIG. 8, mounted within the first section 320 of the air plenum are preferably three tubular sheathed electric coil heaters 330a, 330b, 330c. The heaters are disposed in series in the air plenum such that the forced air travels across, and is heated by, the first two heaters 330a, 330b, and then the forced air travels across, and is further heated by, the third heater 330c. The heaters 330, each having two terminals 332a, 332b, are arranged with the terminals 332 facing outside of the first section 320 of the air plenum.

An exhaust vent 132a is formed in the web portion 126a opposite the side of the air plenum on which the heaters 330 are mounted. The exhaust vent preferably is located at the midpoint of the second 330b and third heaters 330c within the first section 320 of the air plenum. Thus, air expelled from the exhaust vent 132a is at least partially heated by the first two heaters 330a, 330b, while the air remaining in the air plenum beyond the exhaust vent is further heated by the third heater 330c.

As seen in FIGS. 7 and 8, the second section 350 of the air plenum, which is in fluid communication with the first section 320, extends from the first lateral wall 110 to the second lateral wall 112 above the cooking chamber 100. The second section 350 is preferably sufficiently wide enough for the air therein to flow over the recessed housings 150 on the top wall 114. A portion of the air flowing through the second section 350 is expelled through the plurality of oblong vent holes 144 in the perforated sheet 142 (FIG. 6). After exiting the oblong vent holes 144, the air travels across electric coil radiant heaters 146 disposed in the recessed trough 140 of top wall 114.

In addition to providing convective heat, the electric coil heaters 146 emit radiant heat to the food passing thereby. When the food is remote from the radiant heat source, the radiant heat released by the electric coil heaters 146 is generally less than that released by quartz heaters in recessed housings 150a, 150b. However, when the food is in close proximity to the radiant heat source, virtually the same amount of radiant heat is absorbed by the food from the electric coil heaters 146 as is absorbed from the quartz heaters. Consequently, the electric coil heaters 146, in addition to convectively heating the air, supplement the radiant heat generated by the quartz heaters.

Quartz heaters typically operate at relatively high temperatures, e.g. 1500° F. Consequently, the heat generated by the quartz heaters might be conducted to, and dangerously raise, the temperature of the top surface 56 (FIGS. 3 and 8) of the oven housing. In addressing this concern, the forced heated air in the second section 350 of the air plenum is directed over the recessed housings 150a, 150b of the quartz heaters. Thus, the quartz heaters are concomitantly cooled as the forced air is further heated. Since the forced air draws excessive heat off the recessed housings 150a, 150b, the amount of insulation required at the top of the oven has been substantially reduced and a more compact oven is obtained.

As seen in FIG. 8, the third section 380 of the air plenum, which is in fluid communication with the second section 350, extends generally vertically along the second lateral wall 112. The third section 380 extends along the side of the web portion 126b which is opposite the side on which the cooking chamber 100 is disposed. Third section 380 preferably extends about one third of the vertical distance down the second lateral side wall 112 whereupon the air passing within the third section 380 is expelled to the interior of cooking chamber 100 through exhaust vent 132b.

The cross-sectional dimensions of the ducts in the first and third sections 320, 380 of the air plenum are designed to evenly distribute the air exhausted from vents 132a, 132b. In particular, the duct 334b in the third section 380 has a smaller cross sectional flow area than the duct 334a in the first section 330 of the air plenum. This assures that, even though some of the forced air has been expelled as it travels around the air plenum, the forced air exits both vents 132a, 132b at the same mass flow rate. Consequently, even heating throughout the cooking chamber 100 is achieved. Depending on the type and amount of food cooked in the oven, different velocities of air, cooking times and target temperatures are employed. For example, when cooking $3\frac{1}{4}$ lb. chickens with 3 or 4 chickens per spit and with 8 spits total, air at 400°–500° F. is preferably expelled from each exhaust vent 132a, 132b and perforated sheet 142 at a velocity of 2,500–2600 feet/rain for about 45–75 minutes. Of course, the cooking parameters change with different food products.

Figure 9:
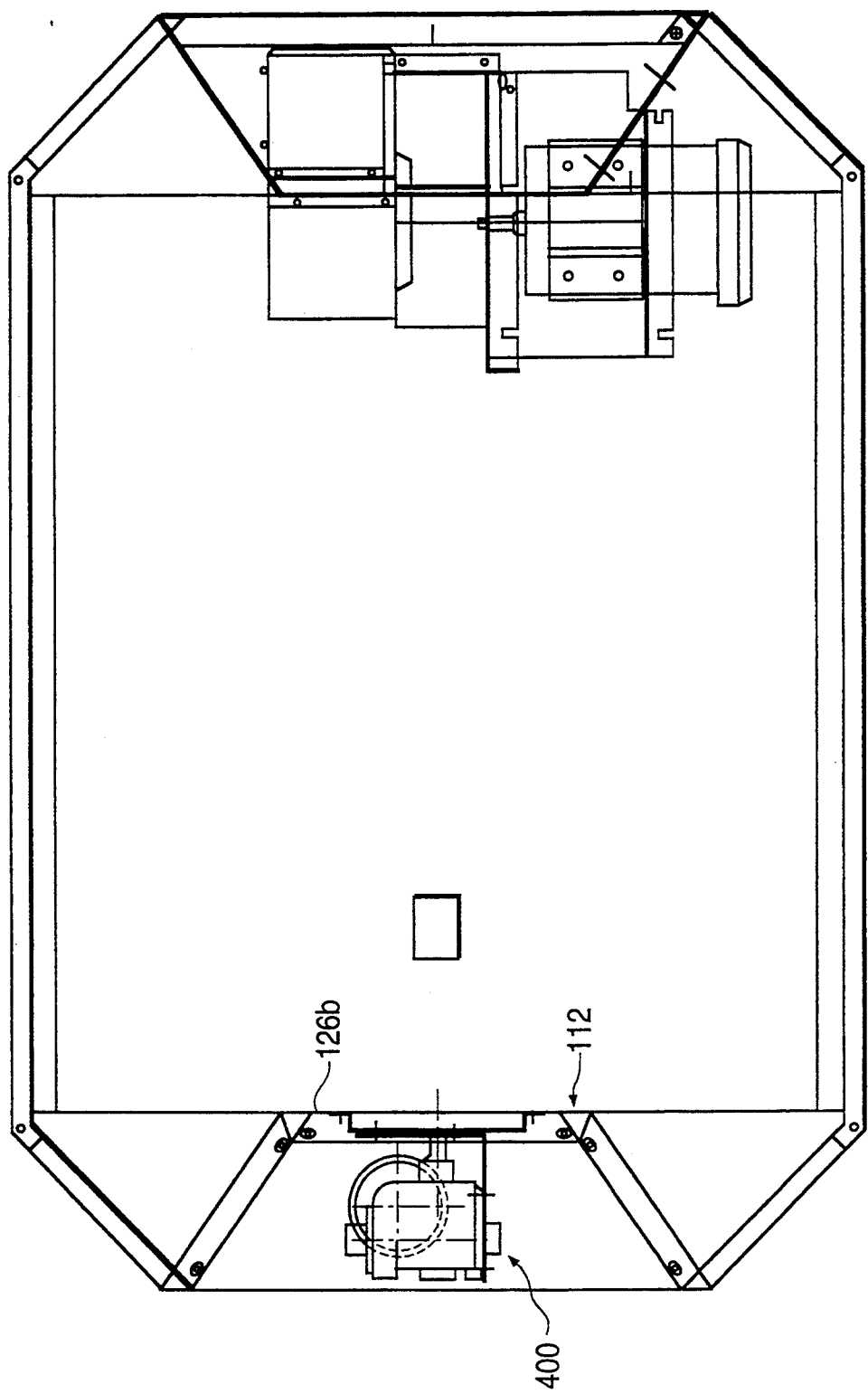
FIG. 9 is a cross section taken along section 9—9 of FIG. 8.

As shown in FIGS. 8 and 9, a motor 400 is mounted preferably on the web portion 126b of the second lateral wall 112 below the third air plenum section 380 and outside of the cooking chamber 100. A drive shaft 410 is drivingly connected to the motor 400. The drive shaft 410 extends between and is mounted to the first lateral wall 110 and the second lateral wall 112 of the cooking chamber. A first disc 420 is mounted on the drive shaft 410 proximate to the first lateral wall 110, and a second disc 430 is mounted on the drive shaft 410 proximate to the second lateral wall 112. The discs 420, 430 have a plurality of corresponding holes 440 (FIG. 3) bored therein. Spits 450, which carry the food, extend between the first and second discs 420, 430 and are securely received in the plurality of holes 440 in the discs 420, 430.

Within the cooking chamber 100, a cylindrical envelop 460 can be defined as extending between the two discs 420, 430. For example, the circumference of the first disc 420 defines one end of the cylindrical envelope 460, while the other end of the cylindrical envelope 460 is defined by the circumference of the second disc 430. The outer wall of the cylindrical envelope 460 is defined substantially by the spits 450 extending between the discs 420, 430. The air expelled from the first exhaust vent 132a is directed into the cylindrical envelope 460 through the first disc 420. Similarly, the air expelled from the second exhaust vent 132b is directed into the cylindrical envelope 460 through the second disc 430. Arrows 470 in FIG. 8 show the direction of air flow from exhaust vents 132a, 132b as it enters the axial ends of the cylindrical envelope 460.

More particularly, the direction of air flow into the middle the cylindrical envelope 460 is controlled by the orientation of the louvers 500 (FIGS. 3 and 5) on the exhaust vents 132a, 132b. By designing the louvers 500 of the vents 132a, 132b such that the air is directed to the middle of the cylindrical envelope 460, the inner side of the food product, which typically faces away from the outer surfaces of the cooking chamber, is cooked in proportion to the side of the food product on the exterior surface of the cylindrical envelope 460.

Directing a flow of forced, heated air to the center of the cooking chamber is necessary, because in prior art rotisserie cooking chambers, the food product is disproportionately heated on the side facing the outer walls of the cooking chamber. Consequently, by directing a steady stream of forced, heated air into the ends of the cylindrical envelope 460, the outer surface of the food product need not charred at the expense of cooking the inner surface thereof. Moreover, when heated air is directed to the interior of the cylindrical envelope 460, the food product is generally cooked at a faster rate than when all of the heat is directed to the food surface on the outside of the cylindrical envelope. Still further, by exhausting forced heated air from three sides of the cooking chamber 100, i.e. the first lateral side wall 110, the second lateral side wall 112, and the top wall 114, a more even heat distribution within the cooking chamber 100 is obtained.

It is also within the purview of the preferred embodiment to provide automatically controlled, variable position dampers 321, 381, (FIG. 8) disposed within the first and third sections 320, 380 of the air plenum adjacent the exhaust vents 132a, 132b. Depending upon the position of the dampers, the mass flow rate of the air exiting the exhaust vents 132a, 132b could be varied independent of the operational state of blower 250.

In addition, the louvers 500, since angled downwardly, prevent grease from entering the interior of the air plenum 300. As the food product is cooked, fat and grease by-products drip therefrom. While the dripping fat and grease is desirable for its self-basting effect, it can, if not properly directed, cake up on the internal non-cooking portions of the oven. In addressing this concern, the exhaust vents 132a, 132b and the inlet vents 134, 136 are designed with louvers 500 having a downwardly inclined orientation. Thus, any grease that does splatter to the lateral side walls 110, 112 of the cooking chamber simply drips off the louvers 500 instead of flowing into the interior of the air plenum 300.

As previously discussed, the first and third sections 320, 380 of the air plenum are preferably designed such that air exits the first and second exhaust vents 132a, 132b at the same mass flow rate. Consequently, the same amount of forced heated air is directed to the interior of the cylindrical envelope 460 from either end thereof. Alternatively, it is within the purview of the preferred embodiment to provide radiant heaters within the cylindrical envelope 460. For example, radiant heaters could be positioned on drive shaft 410. Radiant heaters positioned within the cylindrical envelope 460 could either replace or could be used in addition to the exhaust vents 132a, 132b. Of course, when positioned within cylindrical envelope 460 such as on drive shaft 410, the radiant heaters would brown the inner side surface of the food.

With reference to FIGS. 5 and 7, the skirt portion 200 of the oven includes a front skirt 202 beneath and collinear with the front wall 116 and a rear skirt 204 beneath and collinear with the rear wall 118. Within the skirt portion 200 of the oven are a grease drawer 220, control panel 210 and blower mechanism 250. The top of the skirt portion 200 is defined generally by the bottom of drip tray 160. The grease drawer 220 cooperates with the drip tray 160 to collect the grease in a single location. In particular, grease dripping from the food product flows down drip tray 160, along drain trough 162, through drain hole 164, and into grease drawer 220. An air buffer 206 between the inner drip pan 208 and the drip tray 160 insulates the skirt portion 200 from the cooking area 100.

The grease drawer 220 is located adjacent the control panel 210 on the skirt, and has a first handle 222 depending from the exterior thereof. Grease drawer 220 preferably extends from the front skirt 202 to the rear skirt 204, i.e., has a length corresponding to the distance between the front and rear walls 116, 118. A second handle 224, which is essentially a bar, extends from one lateral wall 226a of the grease drawer to the opposing lateral wall 226b. When the drawer 220 begins to fill with grease, the operator simply pulls the drawer out with the first handle 222 until the second handle 224 is accessible. With each hand securely grasping a respective handle 222, 224, the drawer 220 is withdrawn from the grease drawer receptacle space 228. The relative depth D of the drawer compared to its width W between the lateral side walls 226a, 226b allows for easier and less precise manipulation of the drawer. The grease drawer 220 according to the preferred embodiment preferably has a depth D which is at least one-half the width W. A relatively shallow drawer, on the other hand, would be more susceptible to grease spillage due to wave formation when the operator handles the drawer. The drawer 220 according to the preferred embodiment reduces wave formation, wave propagation, and spillage as the relatively close lateral side walls 226a, 226b reduce the possibility of the wave from ever becoming large enough to overflow. Moreover, since the operator does not grasp the drawer 220 from the bottom, the likelihood of the operator burning themselves is reduced.

Vertical guides 230 are provided on the lower periphery of the drawer receptacle space 228 and surround the lateral side walls 226a, 226b and rear wall 226c of the drawer 220. In addition to positioning drawer 220 within space 228, guides 230 are welded together to provide a containment area in which grease can be stored. Thus, if grease should continue to flow through drain hole 164 after the drawer 220 is removed, the vertical guides 230 contain the grease that might otherwise flow to the entire interior of the skirt area 200. This added grease collection feature is advantageous in that it allows for operator error in the event that the grease drawer 220 is not replaced after it is removed for emptying.

The blower mechanism 250 is also positioned in the skirt portion 200 of the oven, and more particularly, beneath the first lateral wall 110 in the skirt portion 200. Any device for recirculating air could be used as the blower, however, the preferred embodiment incorporates a Balder ¼ horsepower TEFC blower.

With reference to FIG. 5, a temperature sensor probe 260 is provided in the first housing 322 on the suction side of blower 250. More particularly, the temperature sensor 260 is provided behind the first inlet vent 134 which also happens to be adjacent the oven door 58 (FIG. 7). When the oven door 58 is opened to either remove or replenish the spit 450 with food, the heated air in the cooking chamber 100 rushes out and is replaced with cooler ambient air. Since the blower 250 directs air into the suction chamber, cool air almost immediately travels across the temperature sensor 260. The control mechanism 210 will, after sensing the cooler air, activate the heaters 146, 330a, 330b, 330c soon after the oven door 58 is opened. This arrangement provides a rapid temperature recovery system, since the cool air is sensed almost immediately. Accordingly, the oven begins reheating faster and the cooking chamber 100 is maintained closer to a steady state cooking temperature.

The preferred embodiment also includes a door opening sensor. When the door 58 is opened, the motor 400 is disabled. Conversely, when the door 58 is again closed, power is restored to the motor 400, and the motor resumes operation. Consequently, the operator can safely remove or replenish food products on the rotisserie.

Generally speaking, the hottest portions of an oven are concentrated around the various heaters therein. Routing the heat via forced air convection additionally creates high heat gradients proximate to the forced air flow paths. Since commercial rotisserie ovens require complex control systems and mechanical elements, e.g. blowers and motors, it is desirable to isolate these parts from the relatively high cooking temperatures. Accordingly, the rotisserie oven of the preferred embodiment strategically isolates the motor 400, blower 250, and control system 210 from the relatively high cooking chamber temperatures.

The blower motor 250, as seen in FIG. 7, is disposed beneath the drip tray 160 and outside of the first lateral wall 110 of the cooking chamber. Accordingly, the only portion of the blower 250 in direct contact with the high temperature air in the cooking chamber are its suction and discharge chambers.

Similarly, the motor 400, which is mounted on the web portion 126b, is isolated from the cooking chamber 100. Since the motor 400 is mounted outside of the relatively hot cooking chamber 100, it is not necessary to provide a cooling medium along the outside surface thereof. By isolating the motor 400 from the relatively high cooking temperatures, the operating life of the motor 400 is likely extended.

Finally, a control system 210 is provided to control, among other things, the operation of the heaters 146, 330a, 330b, 330c, blower mechanism 250 and motor 400 in response to external indicia such as the temperature of the cooking chamber 100 or the sensed opening of the oven door 58. For example, a control system that could be implemented is disclosed in U.S. Pat. No. 4,968,515, which is hereby incorporated by reference. Since even relatively low cooking temperatures would likely damage the delicate hardware of the control system 210, it is necessary to isolate the hardware from the heated cooking chamber. To this end, the hardware for the control system 210 is disposed within the skirt area 200 of the oven and behind the control panel 212. As discussed above, an air buffer 206 (FIG. 5) between the inner drip pan 208 and the drip tray 160 acts as an insulating barrier between the skirt area 200 and the cooking chamber 100. Consequently, the heat of the cooking chamber 100 is attenuated by the air buffer 206 before it reaches the skirt area 200.

Additionally, in order to further assure a cool environment for the control system 210, the hardware thereof is disposed upstream of a cooling fan 252 (FIG. 5) for the blower 250. As best seen in FIGS. 5 and 7, as the cooling fan 252 draws ambient air through vent 254 in the oven's housing to cool the blower 250, it is directed over the control system's hardware. Arrows 256 in FIG. 5 indicate a cool air stream which is independent and isolated from the hot air of the cooking chamber indicated by arrows 258. Consequently, the temperature of the control system 210 is further isolated from the heat of the cooking chamber 100 through a convective stream of ambient air flowing thereover. The arrows of FIG. 8 generally indicate the cycle of air flow between the air plenum sections and the cooking chamber.

The present invention has been described with reference to the preferred embodiment. This embodiment, however, is merely for example only and the present invention is not intended to be restricted thereto. It will be understood by those skilled in the art that variations and modifications can be easily made within the scope of the present invention as defined by the appended claims.

I claim:

1. An oven comprising:
   a cooking chamber defined by a plurality of walls, said plurality of walls comprising a top wall, a bottom wall opposing said top wall, opposing side walls, a front wall and an opposing rear wall;
   heating means for providing heat to said cooking chamber; and
   an air delivery system at least partially surrounding said cooking chamber, said air delivery system comprising:
   a first air plenum section disposed along at least a portion of a first of said plurality of walls of said cooking chamber;
   first vent means formed in said first air plenum section for venting air between said first air plenum section and said cooking chamber;
   a second air plenum section disposed along at least a portion of a second wall opposing the wall on which said first air plenum section is disposed; and
   second vent means formed in said second air plenum section for venting air between said second air plenum section and said cooking chamber; wherein said first air plenum section is in fluid communication with said second air plenum section such that air flowing through said first and second air plenum sections flows sequentially through said first air plenum section before entering said second air plenum section.

2. The oven of claim 1, further comprising a blower means having a suction side and a discharge side for forcing a stream of air through said cooking chamber.

3. The oven of claim 2, wherein said first air plenum section is disposed on the discharge side of said blower.

4. The oven of claim 2, wherein said second air plenum section is disposed on the discharge side of said blower.

5. The oven of claim 2 wherein said blower is disposed at a lower end of said first air plenum section.

6. The oven of claim 1, wherein said air delivery system further comprises a third air plenum section disposed along at least a portion of a third of said plurality of walls of said cooking chamber.

7. The oven of claim 6, wherein said first, second and third air plenum sections are in fluid communication.

8. The oven of claim 1 further comprising damper means disposed in said first air plenum section for providing a variable flow path between said first air plenum section and said cooking chamber.

9. The oven of claim 8, wherein said damper means is disposed adjacent said first vent means.

10. The oven of claim 1, further comprising damper means disposed in said second air plenum section for providing a variable flow path between said second air plenum section and said cooking chamber.

11. The oven of claim 10, wherein said damper means is disposed adjacent said second vent means.

* * * * *